United States Patent
Thouppuarachchi

(10) Patent No.: US 11,656,849 B2
(45) Date of Patent: May 23, 2023

(54) DEDICATED HARDWARE SYSTEM FOR SOLVING PARTIAL DIFFERENTIAL EQUATIONS

(71) Applicant: Vorticity Inc., Redwood City, CA (US)

(72) Inventor: Chirath Neranjena Thouppuarachchi, Redwood City, CA (US)

(73) Assignee: Vorticity Inc., Redwood City, CA (US)

( * ) Notice: Subject to any disclaimer, the term of this patent is extended or adjusted under 35 U.S.C. 154(b) by 168 days.

(21) Appl. No.: 16/989,821

(22) Filed: Aug. 10, 2020

(65) Prior Publication Data

US 2021/0048986 A1 Feb. 18, 2021

Related U.S. Application Data

(60) Provisional application No. 62/886,873, filed on Aug. 14, 2019.

(51) Int. Cl.
*G06F 1/00* (2006.01)
*G06F 7/64* (2006.01)
*G06F 9/50* (2006.01)
*G06F 17/13* (2006.01)
(Continued)

(52) U.S. Cl.
CPC .............. *G06F 7/64* (2013.01); *G06F 9/5072* (2013.01); *G06F 17/11* (2013.01); *G06F 17/13* (2013.01); *G06N 3/02* (2013.01)

(58) Field of Classification Search
CPC ........ G06N 3/02; G06N 3/0454; G06F 17/11; G06F 17/13; G06F 15/8046
See application file for complete search history.

(56) References Cited

U.S. PATENT DOCUMENTS

| | | | |
|---|---|---|---|
| 4,720,780 A | 1/1988 | Dolecek | |
| 6,041,398 A | * 3/2000 | Pechanek | A21B 1/48 |
| | | | 712/11 |
| 2018/0307980 A1* | 10/2018 | Barik | G06T 1/20 |

(Continued)

OTHER PUBLICATIONS

D.J Evans, G.M Megson, Construction of extrapolation tables by systolic arrays for solving ordinary differential equations,Parallel Computing,V 4, I 1, 1987, pp. 33-48, (https://www.sciencedirect.com/science/article/pii/0167819187900615) retrieved from internet Jul. 25, 2022 (Year: 1987).*

(Continued)

*Primary Examiner* — Tom Y Chang
(74) *Attorney, Agent, or Firm* — Fenwick & West LLP

(57) ABSTRACT

Embodiments relate to a computing system for solving differential equations. The system is configured to receive problem packages corresponding to problems to be solved, each comprising at least a differential equation and a domain, and to select a solver of a plurality of solvers, based upon availability of each of the plurality of solvers. Each solver comprises a coordinator that partitions the domain of the problem into a plurality of sub-domains, and assigns each of the plurality of sub-domains to a differential equation accelerator (DEA) of a plurality of DEAs. Each DEA comprises at least two memory units, and processes the sub-domain data over a plurality of time-steps by passing the sub-domain data through a selected systolic array from one memory unit, and storing the processed sub-domain data in the other memory unit, and vice versa.

20 Claims, 7 Drawing Sheets

(51) Int. Cl.
   *G06N 3/02*      (2006.01)
   *G06F 17/11*     (2006.01)

(56) References Cited

U.S. PATENT DOCUMENTS

2018/0314780 A1* 11/2018 Bertilsson .................. G06F 8/00
2020/0301876 A1*  9/2020 Hamlin ............. G06F 15/17325
2021/0019591 A1*  1/2021 Venkatesh ................ G06N 3/08
2022/0148130 A1*  5/2022 Tang .................... G06N 3/0454

OTHER PUBLICATIONS

Jainandunsing, Kishan. (1989). Parallel algorithms for solving systems of linear equations and their mapping on systolic arrays. https://www.researchgate.net/publication/ retrieved from internet Jul. 25, 2022 (Year: 1989).*

* cited by examiner

DEDICATED HARDWARE SYSTEM FOR SOLVING PARTIAL DIFFERENTIAL EQUATIONS

CROSS-REFERENCE TO RELATED APPLICATION

This application claims the benefit of U.S. Provisional Application No. 62/886,873, filed on Aug. 14, 2019, which is hereby incorporated by reference in its entirety.

BACKGROUND

The present disclosure generally relates to dedicated hardware systems for solving differential equations.

Differential equations are ubiquitous in describing fundamental laws of nature, human interactions and many other phenomena. Applications include fluid dynamics, molecular dynamics, electronic structure, high frequency options trading, brain tissue simulations, satellite orbitals, nuclear explosion simulations, black hole simulations, etc.

Solving of differential equations has been a major use of computers since their advent in the mid-1900s. Today, estimates show that over 50% of high performance computing is diverted towards solving differential equations, from supercomputers at national labs to small computer clusters in medium size companies. As such, a need exists for computers that can more efficiently solve differential equations.

SUMMARY

Embodiments relate to a computing system for solving differential equations. The system is configured to receive problem packages corresponding to problems to be solved, each comprising at least a differential equation and a domain, and to select a solver of a plurality of solvers, based upon availability of each of the plurality of solvers. Each solver comprises a coordinator that partitions the domain of the problem into a plurality of sub-domains, and assigns each of the plurality of sub-domains to a differential equation accelerator (DEA) of a plurality of DEAs. Each DEA comprises at least two memory units a plurality of systolic arrays, each systolic array area comprising hardware for solving a particular type of partial differential equation (PDE). The DEA processes the sub-domain data over a plurality of time-steps by passing the sub-domain data through a selected systolic array from one memory unit, and storing the processed sub-domain data in the other memory unit, and vice versa.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments herein are directed to a purpose built computing architecture to enable fast solving of differential equations within large domains with complicated boundary conditions. Differential equations are ubiquitous in describing fundamental laws of nature, human interactions, and many other phenomena. Applications of differential equations include fluid dynamics, molecular dynamics, electronic structure, high frequency options trading, brain tissue simulations, satellite orbitals, nuclear explosion simulations, black hole simulations, etc.

While simple differential equations can be solved with analytical solutions, many more complicated differential equations must be solved numerically in order to obtain useful results. This usually involves breaking up a problem domain into many slices/nodes/particles etc., and solving a discretized form of the equation on each slice/node/particle. This can be a tedious process. In addition, as domain size and accuracy requirements increase (e.g., resolution of the solution, maximum partition size possible, etc.), the number of calculations needed to be performed can increase dramatically.

The usage of current computer systems (e.g., general-purpose computers) has several problems. In many applications, each particle or node in the domain of the differential equation to be solved requires perhaps ~$10^2$-$10^3$ floating point operations to calculate the next time step. Since these operations have to be done sequentially, the best time scaling that the simulation or solution can achieve is described in Equation (1) below, even without accounting for the clock cycles needed in a von Neumann architecture to fetch instructions, decode, access memory multiple times to perform a single operation.

$$\frac{\text{computer clock speed}[s-1]}{\text{operations per node}[\text{timestep}-1] \times \text{number of nodes in domain}} \text{timesteps}/\text{second} \quad (1)$$

For problems that require "strong vertical scaling" such as molecular dynamics, this ceiling is a major problem where even the best supercomputers can only muster several microseconds of simulation time for several days' worth of compute time.

Figure 1:
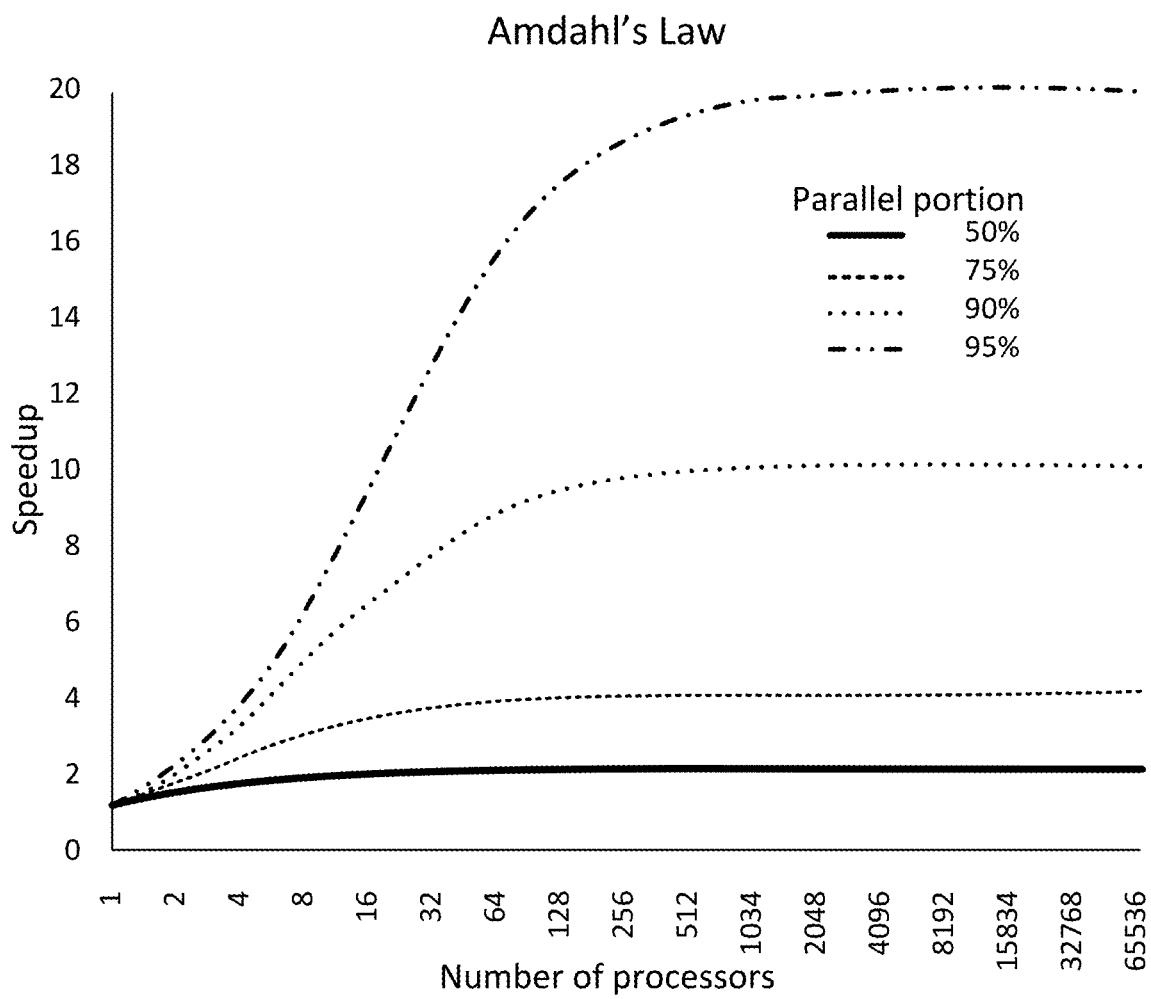
FIG. 1 is a graph illustrating the effects of Amdahl's law.

When possible, for large domain sizes, parallel computing can be used to speed up the solution. However the need to pass large amounts of data between the parallel computing units in such a setup slows down the time to solution. For example, when engineers use 1000 cores, the speed up is no more than 10 times as using a single core. This problem is generally referred to as Amdahl's law. FIG. 1 is a graph illustrating the effects of Amdahl's law. As illustrated in FIG. 1, the speed up in latency of the execution of tasks from using additional parallel processors levels off even as additional parallel processors are added, due to the speedup being limited by the serial portion of the program.

In some applications, a problem may consist of both a small time scale and a very large domain size. An example of this is direct numerical simulations of the Navier Stokes equation. Typically, these types of problems are never solved except on rare occasions on national super computers despite the unprecedented accuracy.

In addition, in cases where the solution at a particular time interval needs to be recorded, then in most cases the computation will stop to download this timestep information, further adding to the time to solution for a given problem.

System Overview

Figure 2:
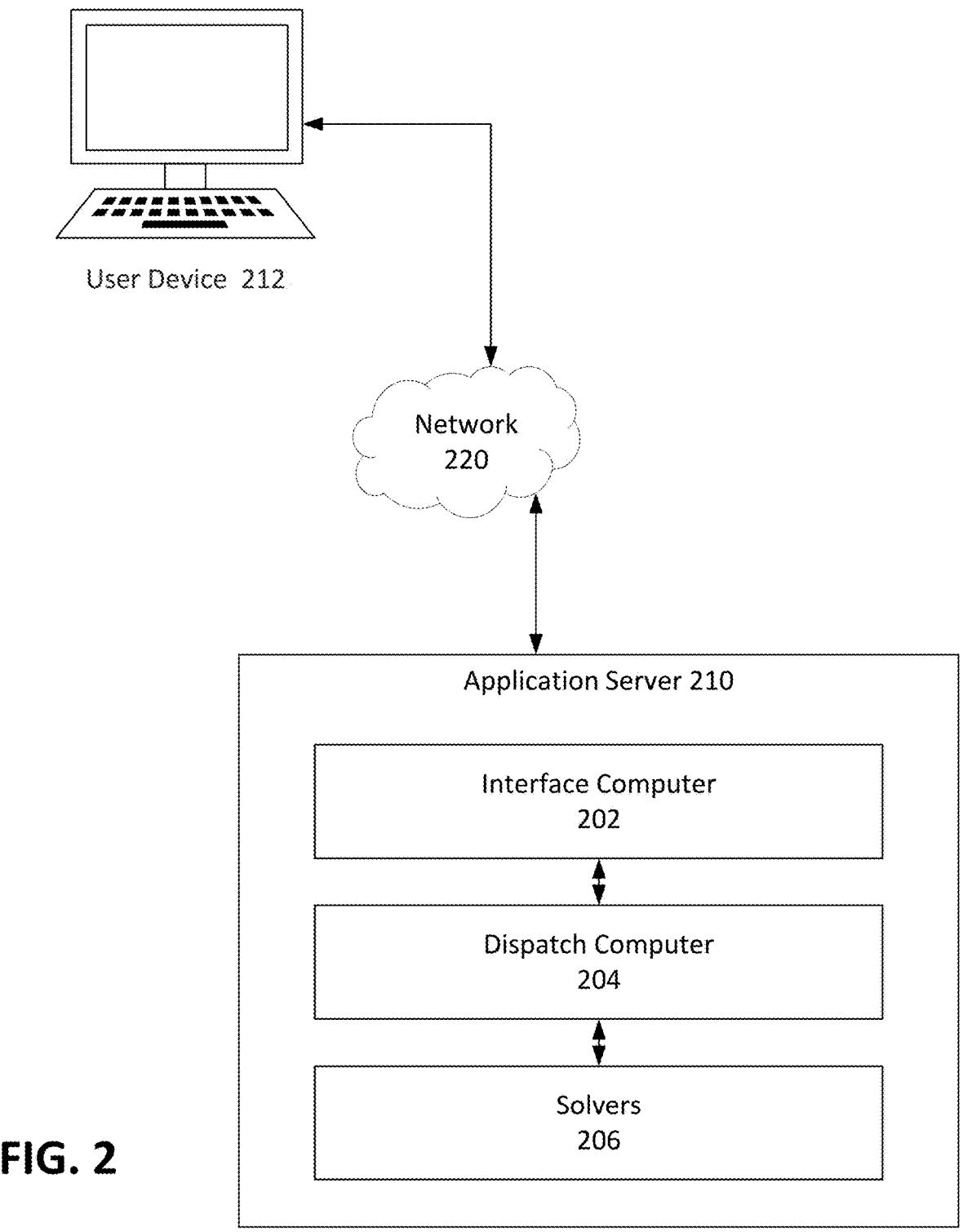
FIG. 2 illustrates a high level diagram of a system for solving differential equations, in accordance with some embodiments.

Embodiments are directed to a computer architecture specialized to solve differential equations that addresses the problems expounded above. FIG. 2 illustrates a high level diagram of a system for solving differential equations, in accordance with some embodiments. The system comprises an interface computer 202, a dispatch computer 204, and a plurality of solver units 206. In some embodiments, the interface computer 202, dispatch computer 204, and solver units 206 are implemented on an application server 210. While FIG. 2 illustrates a single application server 210, it is understood that in other embodiments, the interface computer 202, dispatch computer 204, and solvers 206 may be implemented on multiple servers or devices, on a cloud server, etc.

In some embodiments, the user accesses the application server 210 from a user device 212, such as a PC, laptop, workstation, mobile device, etc. The user device 212 may access the application server 210 through a network 220 (e.g., the Internet). In other embodiments, the user device 212 may connect to the application server 210 via a direct line connection (e.g., a direct line connection to the interface computer 202). In addition, although FIG. 1 only shows a single user device 212 connecting to the application server 210, it is understood that in some embodiments, many user devices may concurrently connect to the application server 210 (e.g., via the network 220).

The user at the user device 212 may transmit to the application server 210 (e.g., through the network 220) one or more problems involving differential equations to be solved. In some embodiments, the user device 212 transmits each problem in the form of a problem package, comprising at least a differential equation associated with the problem, and a domain. In some embodiments, the problem package further comprises a mesh (or particle domain) for the problem, one or more boundary conditions, initial conditions, flow conditions (such as density and viscosity), a solve type (e.g., 3D incompressible DNS Navier Stokes), and/or the like. The problem package may be sent to the interface computer 202 over the secured internet using a provided API of the interface computer 202.

The interface computer 202 receives the problem package, which is processed by the dispatch computer 204 and dispatched to the solvers 206. The solvers 206 generate a solutions package comprising a solved domain that is transmitted back to the user device 212. The solutions package may further comprise one or more averages, one or more solver metrics, one or more errors messages, etc.

Figure 3:
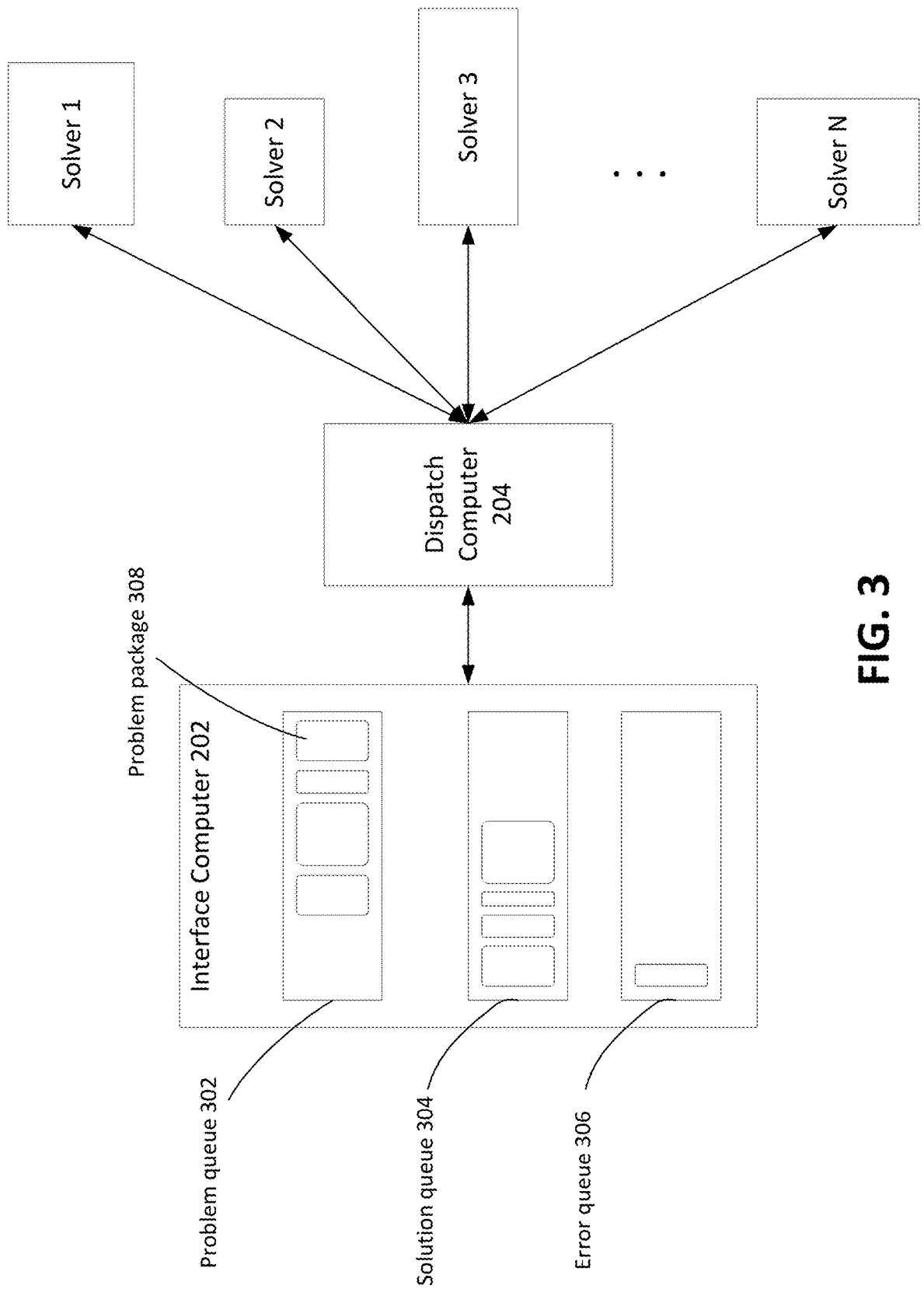
FIG. 3 illustrates a diagram of the interface computer, dispatch computer, and solver units, in accordance with some embodiments.

FIG. 3 illustrates a diagram of the interface computer 202, dispatch computer 204, and solver units 206, in accordance with some embodiments. The interface computer 202 is networked to both the user (e.g., the user device 212) and the dispatch computer 204. The interface computer 202 comprises a problem queue 302, a solution queue 304, and an error queue 306. The interface computer 202 is configured to accept incoming problems to be solved by various interested parties (e.g., problem packages from one or more users at user devices 212), and add the received problem packages 308 to the problem queue 302. In some embodiments, the interface computer 202 may first check the received problem package for accuracy. For example, the interface computer 202 may, if the problem package specifies a time step size and is associated with certain types of differential equations, that the specified time step conforms with the Courant-Friedrichs-Lewy (CFL) convergence condition. In cases where the problem package specifies an unstructured mesh, the interface computer 202 may check if the specified mesh is well-formed. In some embodiments, the interface computer 202 may receive a problem package that comprises geometry information with initial and boundary conditions instead of a mesh, whereupon the interface computer may generate a mesh for the problem based upon the received geometry information and conditions.

The interface computer 202 sends problem packages 308 to the dispatch computer 204 to be solved by one or more of the plurality of solvers 206. In some embodiments, each problem package within the problem queue 302 may be assigned a priority level. The priority level for a problem package 302 may be based upon a provided indication within the problem package, the user from which the problem package was received, one or more parameters of the problem package (e.g., type of differential equation, size of domain, etc.), size of the problem package, an amount of time the problem package has been in the problem queue 302, and/or any combination thereof.

The interface computer 202 is further configured to receive solution information from the dispatch computer 204. In some embodiments, the solution information is received in the form of one or more solution packages (e.g., as described above). In other embodiments, the interface computer 202 reformats the received solution information to form one or more solution packages. The interface computer 202 stores the one or more solution packages in the solution queue 304, and transmits the solution packages from the solution queue 304 to their respective users (e.g., to the user devices 212 responsible for sending the problem package corresponding to the solution package).

In some embodiments, the interface computer 202 receives error information from the dispatch computer 204, corresponding to any errors encountered by the solvers 206 when solving the problem. In some embodiments, the dispatch computer 202 checks the fidelity of the results of the received solution information, and generates one or more errors if any issues are found (e.g., pressure, density, velocity, etc. parameters not being bounded). The determined errors may be stored in the error queue 306, to be transmitted to corresponding users.

The dispatch computer 204 is networked to the interface computer 202 and to one or multiple solver units 206. The dispatch computer determines which solver 206 is the best to solve a given user problem at a given time. As illustrated in FIG. 3, the dispatch computer 204 may be in communication with a plurality of solvers 206 (e.g., solvers 206-1 through 206-n). In some embodiments, the dispatch computer 204 monitors an availability of the solvers 206 (e.g., a capacity of each solver to process additional problems) and the problem queue 302 of the interface computer 202, in order to determine which problem packages 308 should be processed by which of the solvers 206.

The solvers 206 are the workhorses of the system, and are configured to generate solutions to the various problems that come to the system. The solvers may be of different types. For example, each of the solvers 206 may be optimized for one or more specific applications, such as fluid dynamics, molecular dynamics, electronic structure, etc. In some embodiments, each solver 206 may also be optimized to solve domains of different sizes. The various sizes may help optimize the use of the hardware by allocating larger problems to the larger solvers and smaller problems to the smaller solvers.

Solver Structure

Figure 4:
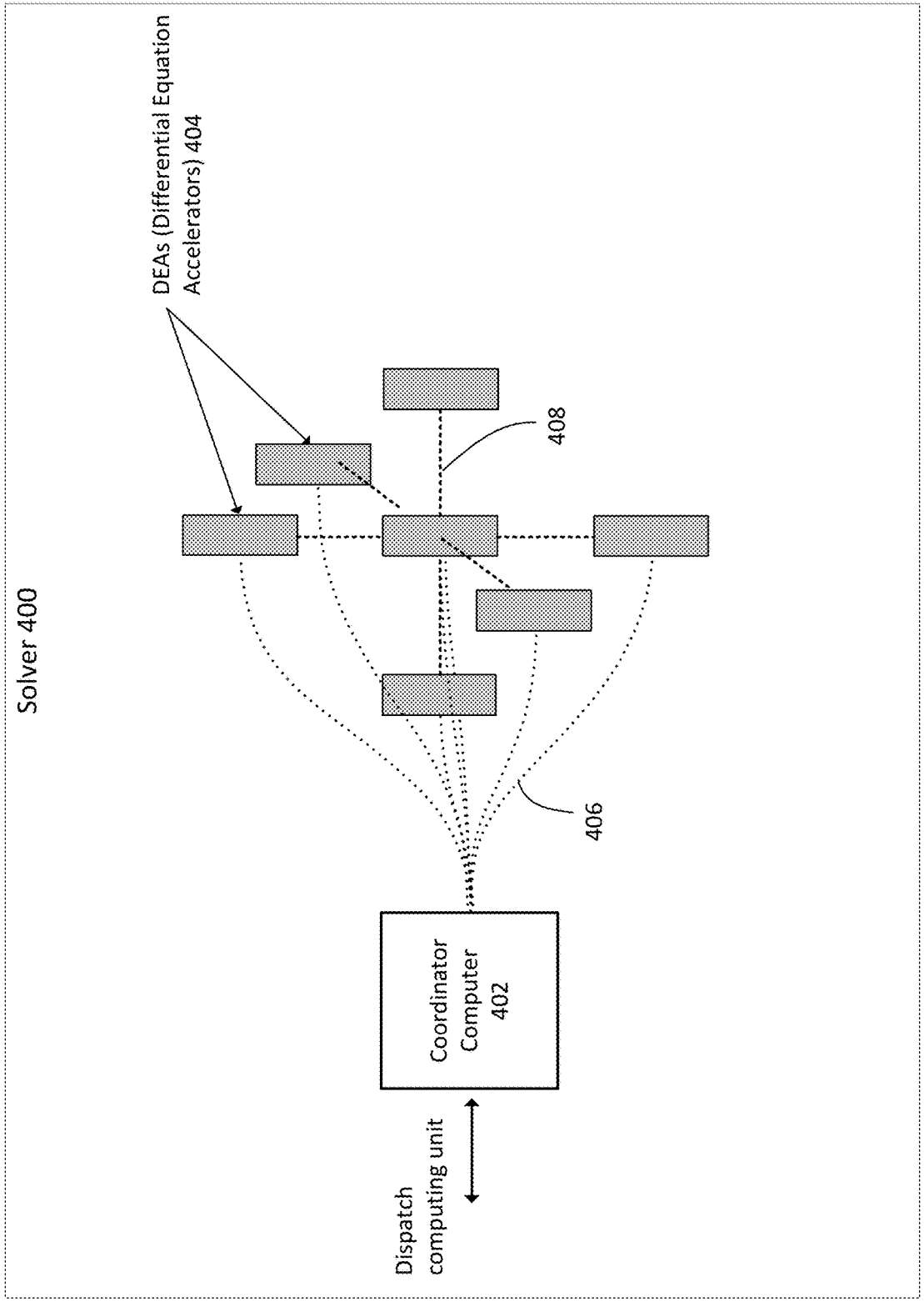
FIG. 4 is a diagram illustrating components of a solver, in accordance with some embodiments.

FIG. 4 is a diagram illustrating components of a solver, in accordance with some embodiments. The solver 400 illustrated in FIG. 4 may correspond to one of the solvers 206 illustrated in FIGS. 2 and 3. The solver 400 comprises a coordinator computer 402, multiple compute units (referred to as Differential Equation Accelerator (DEA) units, or DEAs) 404, one or more DEA-Coordinator interconnects 406, and one or more DEA-DEA interconnects 408.

The coordinator computer 402 (or coordinator 402) is connected to the dispatch computer (e.g., dispatch computer 204) on one side and to multiple DEAs 404 on the other. The coordinator 402 is responsible for coordinating the various aspects of the DEAs when solving a user problem. For example, the coordinator 402 may, in response to receiving a problem package, divide the domain of the problem into a plurality of subdomains, and assigns each subdomain to a respective DEA 404. The coordinator 402 may synchronize the DEAs 404 and initiates solving operations by the DEAs 404. The coordinator 402 further downloads results from each of the DEAs 404.

The solver 400 comprises a plurality of DEAs 404. Each DEA 404 is configured to receive a subdomain of a problem, and generate solution data for the received subdomain. The coordinator computer 402 and the DEAs 404 are connected via DEA-Coordinator interconnects 406 and DEA-DEA interconnects 408, allowing for the coordinator 402 to manage operations of the DEAs 404, and for the DEAs 404 to share stored domain information with each other (discussed in greater detail below).

The DEA-Coordinator interconnects 406 and DEA-DEA interconnects 408 may be implemented as cabling connecting the coordinator 402 to the DEAs 404, and the DEAs 404 to each other, respectively. In some embodiments the interconnects 406 and 408 may be implemented using PCI Express cables (e.g., PCIe v4.0). The number of interconnects between the DEAs 404 may be contingent on how the domain is sliced up across the DEAs in that solver, e.g., based on a partitioning scheme of the solver for partitioning received domains. For example, if the solver is configured to slice the domain up into pyramids, then the number of interconnects may be smaller compared to if it was sliced up into higher order polygons. In some embodiments, if the number of DEAs 404 is large, then it may be hard to physically connect all the DEAs 404 onto one coordinator 402. In such cases, relays (not shown) can be used to bunch up some of the cabling.

Figure 5:
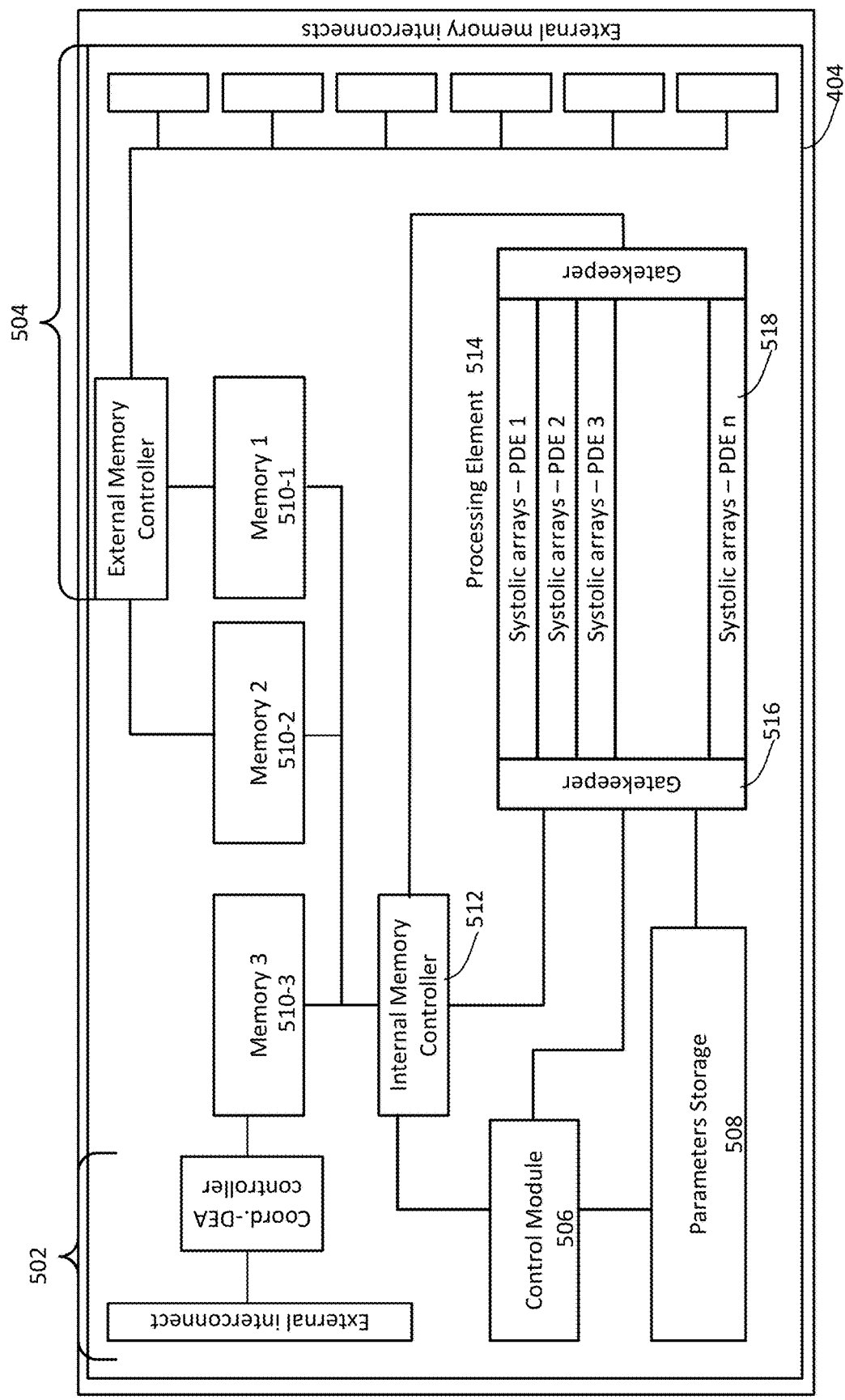
FIG. 5 illustrates a layout of a DEA, in accordance with some embodiments.

FIG. 5 illustrates a layout of a DEA 404, in accordance with some embodiments. The DEA comprises a coordinator-DEA interconnect and controller 502, which is a special circuit and interconnect that manages the data and control signals going back and forth between the DEA unit and the coordinator 402. For example, the DEA may receive problem and subdomain data from the coordinator 402 via the coordinator-DEA interconnect and controller 502. The DEA may also receive instructions from the coordinator 402 (e.g., synchronization instructions to synchronize with other DEAs of the solver, instructions to begin solving, etc.). In addition, the DEA may transmit generated solution information corresponding to the received problem and subdomain back to the coordinator through the coordinator-DEA interconnect and controller 502.

The external memory interconnect & controller 504 is a special circuit and interconnect that manages data and control signals between the various DEA units. For example, as will be discussed in greater detail below, in some embodiments, the DEA may require information relating to other subdomains being processed by other DEAs of the solver. As such, the DEA may receive additional subdomain data from other DEAs via the external memory interconnect & controller 504.

The control module 506 manages the overall functioning of the DEA unit. In some embodiments, the control module 506 is a processor that processes received subdomain data, determines and stores parameters associated with the problem subdomain (e.g., in the parameters storage 508), and manages solving of the problem subdomain (e.g., using the processing element 514) over a plurality of time-steps.

The parameters storage 508 is configured to store local variables used during the solving of differential equations. In some embodiments, the parameters storage 508 is implemented as an SRAM. The stored local variables may include any type of variable expected to be highly used during solving of the problem assigned to the DEA that are expected to change during the solving, such as subdomain data, solve type, and one or more constants to be used during the solving of the subdomain (e.g., fluid density, viscosity, etc.).

The memory 510 is used to store the problem to be solved. In some embodiments, the memory 510 of each DEA is divided into three subunits (e.g., first memory unit 510-1, second memory unit 510-2, and third memory unit 510-3). In some embodiments, the memory units 510-1 through 510-3 are implemented as part of the same memory. In other embodiments, the memory units 510-1 through 510-3 are implemented as two or more separate memory chips.

In some embodiments, first and second memory units 510-1 and 510-2 are used in general solving of the differential equation, while the third memory unit 510-3 may be used when the DEA needs to send data back to the coordinator (e.g., via the coordinator-DEA interconnect and controller 502). In some embodiments, access to the memory units 510-1 to 510-3 is managed by the internal memory controller 512. For example, the internal memory controller 512 may receive instructions from the control module 506 to retrieve data between the first and second memory units 510-1 and 510-2 and the processing element 514, move processed data to the third memory unit 510-3 in preparation for transmission to the coordinator of the solver, and/or the like.

The processing element 514 is configured to receive problem data (e.g., from the first or second memory units 510-1 and 510-2) and to solve the received problem data using one or more systolic arrays. In some embodiments, the processing element 514 comprises one or more gatekeeper circuits 516 (also "gatekeepers 516") and a plurality of systolic array circuits 518 ("systolic arrays 518"). The gatekeepers 516 are circuits that divert data from memory (e.g., from the first or second memory units 510-1 and 510-2 via the internal memory controller 512) to the systolic arrays 518 and vice versa, depending on which equation is solved. For example, the gatekeeper 516 may receive information indicating a type of differential equation to be solved from the parameters storage 508 where solver parameters are kept, and select which systolic array 518 to use to process problem data received from the first memory unit 510-1 or the second memory unit 510-2.

The systolic arrays 518 each comprise hardware configured to solve a particular type of partial differential equation (PDE). In some embodiments, the systolic arrays 518 comprise at least one systolic array for each type of PDE that the DEA is designed to solve. For example, a systolic array may be configured to solve 1-D differential equations such as linear convection, non-linear convection, diffusion, Burger's equation, Laplace equation, Poisson equation, Euler's equation, Navier stokes simulations, etc. In some embodiments, a systolic array may be configured to solve a multi-dimensional differential equation. In some embodiments, depending on the similarity of the equation, different PDEs may be solved on the same systolic array with minor changes to the calculation made by gates of the systolic array based upon parameters provided by the parameters storage 508.

Figure 6:
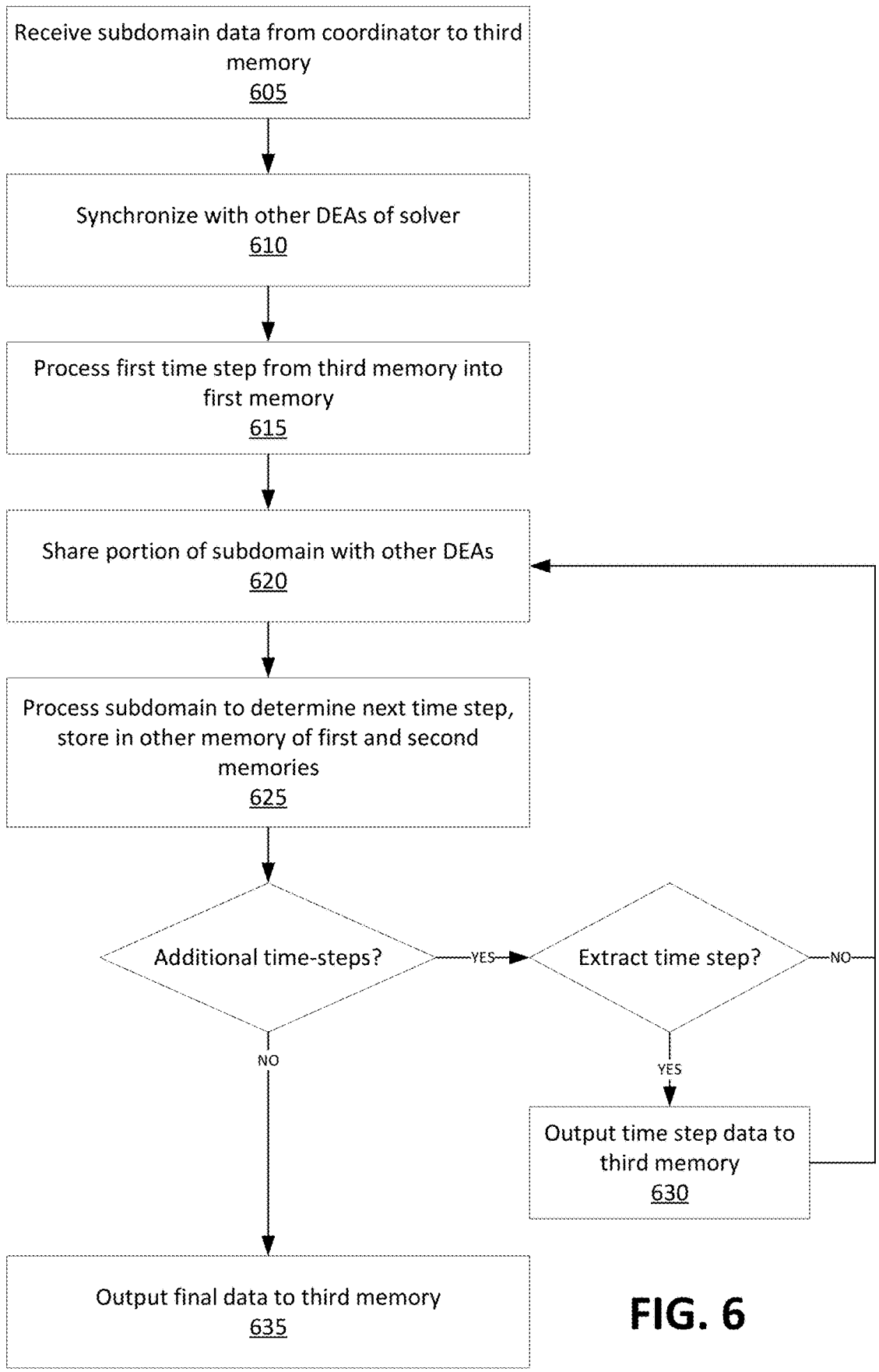
FIG. 6 is a flowchart of a process for using a DEA to solve a subdomain, in accordance with some embodiments.

The DEA is configured to solve a subdomain of the problem sent to it by the coordinator. FIG. 6 is a flowchart of a process for using a DEA to solve a subdomain, in accordance with some embodiments. The DEA receives 605 subdomain data from the coordinator of the solver. The received subdomain data may be copied into the third memory unit 510-3. In addition, the DEA may receive other data of the problem package, such as flow conditions, solve type, and constants such as fluid density and viscosity, which is copied into the parameters storage 508. In some embodiments, each DEA may also receive external domain data part of the initial mesh, corresponding to portions of subdomains adjacent to the DEA's assigned subdomain, for use in determining the first time-step for the subdomain.

Once all data has been disseminated by the coordinator to the DEAs of the solver, the DEA is synchronized 610 with the other DEAs of the solver by the coordinator. The coordinator syncs all DEAs having an assigned subdomain, and then initiates solving, during which each DEA processes its assigned subdomain over a plurality of time steps. In some embodiments, the DEA begins solving 615 by processing the first time step of the whole subdomain stored in the third memory unit 510-3 using the processing element 514, storing the results of the processing into the first memory unit 510-1. The process may take 1 or more clock cycles. In some embodiments, memory sharing between DEAs may not need to be performed at this point, as external domain data corresponding to data from other subdomains needed to process the first time step for the subdomain may have been received from the initial mesh.

In some embodiments, the DEAs of the solver are synchronized to concurrently perform each time step. During each time step, the DEAs share 620 parts of the subdomain stored in the first memory unit 510-1 as needed, which is discussed in greater detail below in relation to FIGS. 7A and 7B. In addition, each DEA processes 625 its respective subdomain through the processing element 514 to determine the next time step for the subdomain. For example, the processing element 514 may receive the subdomain data from the first memory unit 510-1, and select an appropriate systolic array 518 to be used for processing, using stored parameters from the parameters storage 508. The results of the processing are stored in the second memory unit 510-2. Although FIG. 6 illustrates 620 and 625 as separate steps, it is understood that these two steps may be performed concurrently.

The DEAs may repeat time stepping over a plurality of cycles (steps 620 and 625). Over each time step, the processing element receives the subdomain data from the first or second memory unit 510-1 or 510-2, selects a systolic array for processing the data, and stores the processed data into the opposite memory unit (e.g., from the first memory unit 510-1 to the second memory unit 510-2, or vice versa). In addition, memory sharing with other DEAs may be performed concurrently. In some embodiments, the same systolic array may be used for each time-step. In other embodiments, different systolic arrays may be selected, based upon the problem being solved. For example, when solving a combustion problem, a first pass may comprise one or more time-steps in which a systolic array for solving fluid dynamics is selected, and a second pass may comprise one or more time-steps using a systolic array for solving for the chemistry.

In some embodiments, if a data extraction for a particular time-step is needed, then the processing element 514 may also output 630 the processed data to the third memory unit 510-3 along with to first or second memory unit 510-1 or 510-2. The DEA may then inform the coordinator of the solver to download the time-step data from the third memory unit 510-3. In addition, the DEA may concurrently continue to solve between the first and second memory units 510-1 and 510-2, since the data download could last more than one clock cycle. In some embodiments, the DEA is configured to output its data to the third memory unit 510-3 for download by coordinator as "snapshots" at predetermined intervals (e.g., every predetermined number of time-steps) or in accordance with a predetermined function. In other embodiments, these snapshots may be taken dynamically. The snapshot data may be used to analyze how the solution of the problem package evolves over time, and/or to perform accuracy checks (e.g., verify that momentum or energy are conserved).

In some embodiments, a number of time-steps to be solved may be explicitly indicated as part of the problem package. In other embodiments, the problem may be implicit, in which the solver solves until a specified parameter reaches a predetermined value. For example, the solver, at each time-step, may check the root mean square of the velocities and stop solving once it has reached a certain critical value. In some cases, a maximum number of steps may be specified, in case the aggregate critical value is not reached.

At the completion of solving, the final processed data may be output 635 by the processing element 514 to the third memory unit 510-3. The DEA then informs the coordinator to download the solved data for the subdomain from the third memory unit 510-3. The coordinator, upon downloading the solved subdomain data from each of the plurality of DEAs, assembles the solved subdomain data into a solutions package comprising a solved domain that is transmitted back to the interface computer (e.g., to be stored in the solution queue 304 and provided back to the user device 212). In addition, to the extent that the solved subdomain data from the plurality of DEAs contains any errors, the coordinator may generate one or more error messages associated with an output solution package to be stored in the error queue 306.

By dividing the memory of the DEA into first and second memory units 510-1 and 510-2, the DEA ensures that processed data for each time step can be written to memory without disturbing the original pre-time step data until processing of the entire subdomain is completed. In addition, third memory unit 510-3 allows for data to be extracted and sent to the coordinator without interrupting time step processing of the subdomain data.

Concurrent Time-Stepping and Memory Sharing

Figure 7A:
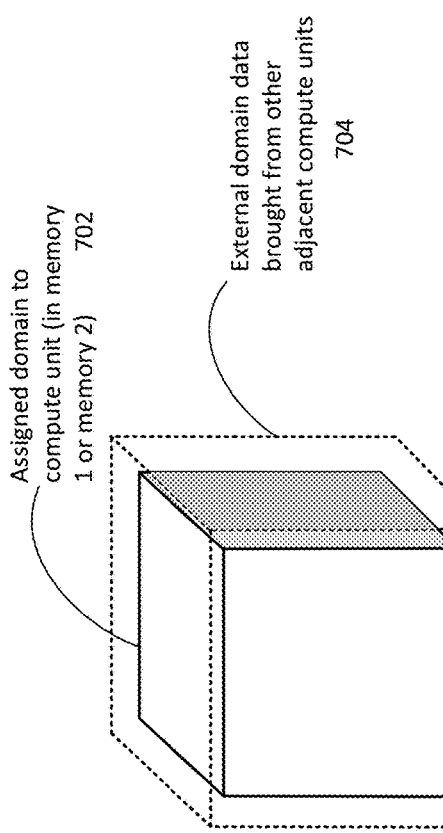
FIG. 7A illustrates an example of a domain to be processed by a DEA, in accordance with some embodiments.

In some embodiments, each DEA of a solver processes a particular domain of data corresponding to a subdomain of the total domain of the problem package. When processing portions of the domain, the processing elements of the DEA may need to access data corresponding to adjacent portions of the domain (e.g., adjacent in time, space, etc., depending on the problem to be solved). Where the portion of the domain is at or near the edge of the domain, the adjacent portions may be part of other domains processed by other DEAs of the solver. FIG. 7A illustrates an example of a domain to be processed by a DEA, in accordance with some embodiments. For illustrative purposes, the domain 702 to be processed by the DEA is shown in FIG. 7A in the form of a cube, although it is understood that in other embodiments, the domain may be visualized in other ways, or may not be able to be visualized as a cube. Data corresponding to the domain 702 may be stored in either the first or second memory units of the DEA. In order to perform computations at the edges of the domain 702, the DEA may need access to data from other domains (e.g., external domain data 704) associated with domains being processed by other DEAs of the solver. The external domain data 704 comprises data from other domains that are adjacent to the domain 702. In addition, data near the edges of the domain 702 may need to be used as external domain data for domains processed by other DEAs (not shown).

In some embodiments, the coordinator 402 of the solver coordinates the operations of the DEAs 404, so that each of the DEAs 404 is processing the same time step over the same cycle, ensuring that the memory shared between the DEAs during a given cycle is applicable to the same time step across all the DEAs. Without concurrent time-stepping and memory sharing, the processing of the problem may have to stop while key details from the adjacent DEAs are shared, which can waste many 100s of clock cycles. The amount of detail that has to be shared depends on the problem being solved. For example, in case illustrated in FIG. 7A, the additional details necessary to compute the next time step is a linear expansion of the domain by several nodes.

Figure 7B:
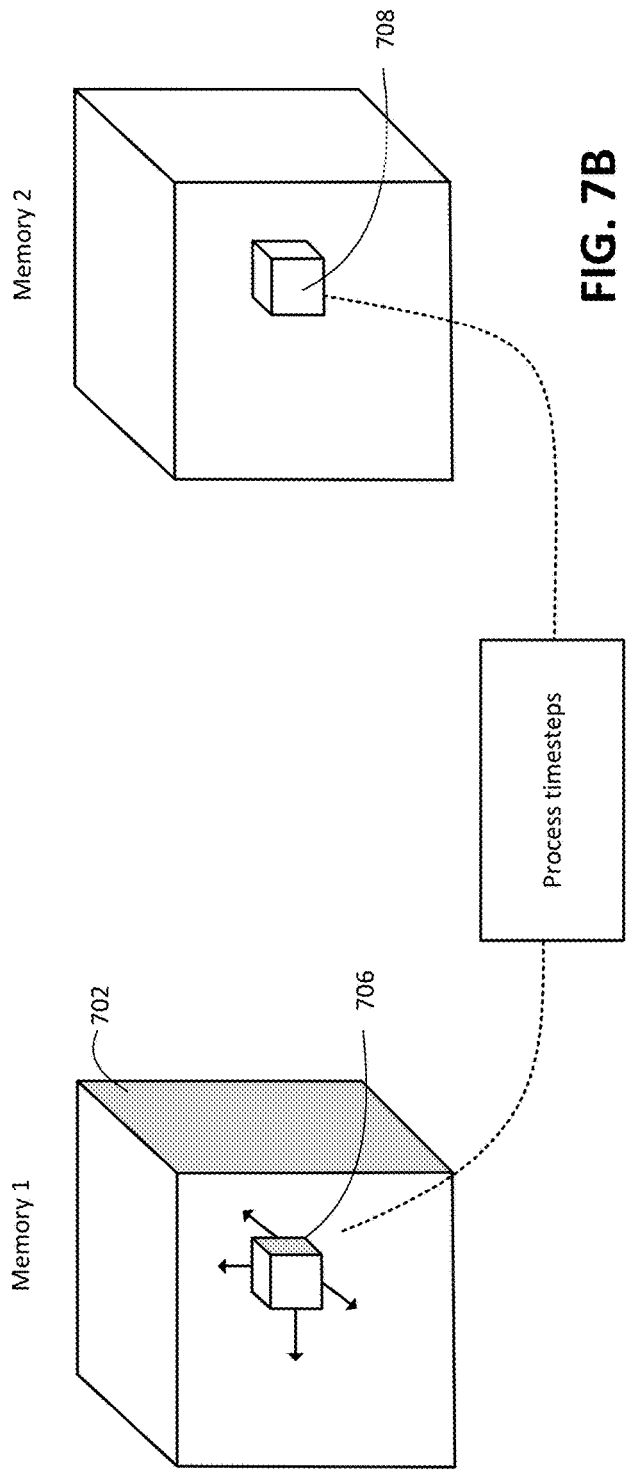
FIG. 7B illustrates an example of optimizing processing within a domain, in accordance with some embodiments.

In some embodiments, processing within the domain can be optimized based on the problem being solved. FIG. 7B illustrates an example of optimizing processing within a domain, in accordance with some embodiments. In this example, processing can happen inside out because the time taken to move processing to the edge of the domain can be used to complete the data sharing between the adjacent DEAs. For example, the DEA may process the domain 702 starting from the first portion 706 near the center of the domain to generate a processed portion 708 corresponding to a processed time-step of the first portion 706. In some embodiments, in order to process each portion of the domain 702 (e.g., the first portion 706), the processing element of the DEA may require information corresponding to portions of the domain 702 adjacent to the portion to be processed. To process portions of the domain 702 at the edge of the domain, the processing element may require portions of adjacent domains being handled by other DEAs of the solver (e.g., from the first memory units of other DEAs of the solver).

This strategy works in this example because the extra information from other DEAs is added to the outside of the solving domain and is not required until the processing element reaches the domain faces of the domain 702. Since the DEA does not process the portions near the edge of the domain until after other portions of the domain have been processed, this may serve to ensure that the DEA does not need to wait for the external domain data to be available, potentially eliminating delays due to the external domain data not being immediately available when the DEAs begins processing the domain 702 for the current time step.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed:

1. A system comprising:
   an interface computer configured to receive a problem to be solved, the problem comprising a differential equation and a domain, and to store the received problem in a problem queue;
   a dispatch computer configured to receive the problem from the problem queue, and to select a solver of a plurality of solvers, based upon availability of each of the plurality of solvers;
   wherein each solver comprises:
      a coordinator;
      a plurality of differential equation accelerator (DEA) units, wherein each DEA unit comprises a plurality of systolic arrays, each systolic array having a hardware configuration for solving a corresponding type of differential equation;
      wherein the coordinator, in response to receiving the problem from the dispatch computer, partitions the domain into a plurality of sub-domains, and assigns each of the plurality of sub-domains to a respective DEA unit of the plurality of DEA units; and
      wherein each of the plurality of DEA units having an assigned sub-domain is configured to process sub-domain data of its assigned sub-domain over a plurality of time-steps, by, during each time-step of the plurality of time-steps, processing the data of its assigned sub-domain corresponding to the time-step through a systolic array of the plurality of systolic arrays to generate sub-domain data corresponding to a next time-step of the plurality of time-steps.

2. The system of claim 1, wherein a DEA unit of the plurality of DEA units is configured to process sub-domain data over the plurality of time-steps by, for a time-step of the plurality of time-steps:

storing the sub-domain data in a first memory portion;
selecting a systolic array of the plurality of systolic arrays for processing the sub-domain data, based upon a type of differential equation of the problem;
processing the sub-domain data using the selected systolic array to generate processed sub-domain data corresponding to the next time-step;
storing the processed sub-domain data in a second memory portion separate from the first memory portion.

3. The system of claim 2, wherein the DEA unit is further configured to:
store the processed sub-domain data in a third memory portion separate from the first and second memory portions; and
transmit the processed sub-domain data from the third memory portion to the coordinator.

4. The system of claim 2, wherein the DEA unit further comprises a parameter storage separate from the first and second memory portions configured to store one or more constants associated with the problem, and wherein the selected systolic array is configured to receive at least a portion of the one or more constants from the parameter storage for processing the sub-domain data to generate processed sub-domain data corresponding to the next time-step.

5. The system of claim 1, wherein a first DEA unit of the plurality of DEA units having an assigned first sub-domain of the plurality of sub-domains is configured to, for each time-step of the plurality of time-steps, receive external domain data corresponding to a portion of a second sub-domain adjacent to the first sub-domain that has been assigned to a second DEA unit of the plurality of DEA units, used to determine data corresponding to the next time-step for the first sub-domain.

6. The system of claim 5, wherein the first DEA unit is configured to, during each time-step, process data of its assigned sub-domain in an order such that a portion of the first sub-domain located farther from the external domain data in the domain is processed before a portion of the first sub-domain located nearer the external domain data in the domain.

7. The system of claim 1, wherein the plurality of DEA units of the solver are connected in an arrangement based upon a partitioning scheme used by the coordinator to partition the domain into the plurality of sub-domains.

8. The system of claim 1, wherein the coordinator is further configured to:
receive, from each of the plurality of DEA units having an assigned sub-domain, processed sub-domain data corresponding to the sub-domain processed over the plurality of time-steps;
generate a solution package corresponding to the problem by assembling the received processed sub-domain data from each of the plurality of DEA units;
transmit the solution package to a solution queue of the interface computer.

9. A method for solving differential equations, comprising:
receiving, at a problem queue of an interface computer, a problem to solved comprising a differential equation and a domain;
selecting, at a dispatch computer configured to receive the problem from the problem queue, a solver of a plurality of solvers, based upon availability of each of the plurality of solvers, wherein the solver comprises:
a coordinator; and
a plurality of differential equation accelerator (DEA) units, wherein each DEA unit comprises a plurality of systolic arrays, each systolic array having a hardware configuration for solving a corresponding type of differential equation;
at the coordinator, in response to receiving the problem from the dispatch computer, partitioning the domain into a plurality of sub-domains, and assigning each of the plurality of sub-domains to a respective DEA unit of the plurality of DEA units; and
at each of the plurality of DEA units having an assigned sub-domain, processing sub-domain data of its assigned sub-domain over a plurality of time-steps, by, during each time-step of the plurality of time-steps, processing the data of its assigned sub-domain corresponding to the time-step through a systolic array of the plurality of systolic arrays to generate sub-domain data corresponding to a next time-step of the plurality of time-steps.

10. The method of claim 9, further comprising, at a DEA unit of the plurality of DEA units, for a time-step of the plurality of time-steps:
storing the sub-domain data in a first memory portion;
selecting a systolic array of the plurality of systolic arrays for processing the sub-domain data, based upon a type of differential equation of the problem;
processing the sub-domain data using the selected systolic array to generate processed sub-domain data corresonding to the next time-step;
storing the processed sub-domain data in a second memory portion separate from the first memory portion.

11. The method of claim 10, further comprising, at the DEA unit:
storing the processed sub-domain data in a third memory portion separate from the first and second memory portions; and
transmitting the processed sub-domain data from the third memory portion to the coordinator.

12. The method of claim 10, further comprising, storing, at the DEA unit, one or more constants associated with the problem at a parameter storage separate from the first and second memory portions, and wherein the selected systolic array receives at least a portion of the one or more constants from the parameter storage for processing the sub-domain data to generate processed sub-domain data corresponding to the next time-step.

13. The method of claim 9, further comprising, at a first DEA unit of the plurality of DEA units having an assigned first sub-domain of the plurality of sub-domains, for each time-step of the plurality of time-steps, receiving external domain data corresponding to a portion of a second sub-domain adjacent to the first sub-domain that has been assigned to a second DEA unit of the plurality of DEA units, and using the received external domain data to determine data corresponding to the next time-step for the first sub-domain.

14. The method of claim 13, further comprising, at the first DEA unit, during each time-step, processing data of its assigned sub-domain in an order such that a portion of the first sub-domain located farther from the external domain data in the domain is processed before a portion of the first sub-domain located nearer the external domain data in the domain.

15. The method of claim 9, wherein the plurality of DEA units of the solver are connected in an arrangement based upon a partitioning scheme used by the coordinator to partition the domain into the plurality of sub-domains.

16. The method of claim 9, further comprising, at the coordinator:
receiving, from each of the plurality of DEA units having an assigned sub-domain, processed sub-domain data corresponding to the sub-domain processed over the plurality of time-steps;
generating a solution package corresponding to the problem by assembling the received processed sub-domain data from each of the plurality of DEA units;
transmitting the solution package to a solution queue of the interface computer.

17. A solver circuit, comprising:
a coordinator configured to:
receive a problem to be solved, the problem associated with a differential equation and a domain;
in response to receiving the problem, partition the domain into a plurality of sub-domains; and
a plurality of differential equation accelerator (DEA) units, each comprising a plurality of systolic arrays, each systolic array having a hardware configuration for solving a corresponding type of differential equation, and a DEA unit of the plurality of DEA units is configured to:
receive a sub-domain of the plurality of sub-domains assigned by the coordinator; and
process sub-domain data of the assigned sub-domain over a plurality of time-steps, by, during each time-step of the plurality of time-steps, processing the data of the assigned sub-domain corresponding to the time-step through a systolic array of the plurality of systolic arrays selected based upon a type of the differential equation associated with the problem, to generate sub-domain data corresponding to a next time-step of the plurality of time-steps.

18. The solver circuit of claim 17, wherein the DEA unit is configured to process sub-domain data over the plurality of time-steps by, for a time-step of the plurality of time-steps:
storing the sub-domain data in a first memory portion;
processing the sub-domain data using the selected at least one systolic array to generate processed sub-domain data corresponding to the next time-step;
storing the processed sub-domain data in a second memory portion separate from the first memory portion.

19. The solver circuit of claim 17, wherein the DEA unit is configured to, for each time-step, receive external domain data corresponding to a portion of sub-domain data assigned to a second DEA unit of the plurality of DEA units, the external domain data corresponding a portion of the domain adjacent to the sub-domain assigned to the first DEA unit.

20. The solver circuit of claim 17, wherein the coordinator is further configured to:
receive, from each of the plurality of DEA units having an assigned sub-domain, processed sub-domain data corresponding to the sub-domain processed over the plurality of time-steps;
generate a solution package corresponding to the problem by assembling the received processed sub-domain data from each of the plurality of DEA units;
transmit the solution package to a solution queue of the interface computer.

* * * * *